United States Patent [19]

Bodor et al.

[11] 4,103,037

[45] Jul. 25, 1978

[54] LOW FAT SPREAD

[75] Inventors: Janos Bodor, Voorburg; Jan van Heteren; Laurentius Adrianus Maria Verhagen, both of Vlaardingen, all of Netherlands

[73] Assignee: Lever Brothers Company, New York, N.Y.

[21] Appl. No.: 738,933

[22] Filed: Nov. 4, 1976

[30] Foreign Application Priority Data

Nov. 7, 1975 [GB] United Kingdom ............... 46215/75

[51] Int. Cl.$^2$ ................................................ A23L 1/04
[52] U.S. Cl. .................................... 426/575; 426/576; 426/656; 426/657; 426/804
[58] Field of Search ............... 426/603, 604, 601, 589, 426/575, 576, 656, 657, 804

[56] References Cited

U.S. PATENT DOCUMENTS

| | | | |
|---|---|---|---|
| 2,143,651 | 1/1939 | Fisher | 426/603 |
| 2,156,036 | 8/1939 | Wilt | 426/603 |
| 3,266,904 | 8/1966 | Duin et al. | 426/604 |
| 3,366,492 | 1/1968 | Voss et al. | 426/603 |
| 3,418,133 | 12/1968 | Nijhoff | 426/603 |
| 3,519,436 | 7/1970 | Bauer et al. | 426/603 |
| 3,922,376 | 11/1975 | Strinning et al. | 426/603 |

*Primary Examiner*—Jeanette M. Hunter
*Attorney, Agent, or Firm*—Melvin H. Kurtz

[57] ABSTRACT

The process of the invention provides proteinaceous low fat spreads, stabilized by means of a gelling agent of a melting point of 25°–35° C and essentially containing proteins dissolved in the aqueous phase and/or undissolved protein particles having a major dimension of no more than 5 microns. The preferred process involves preparing the aqueous phase by combining proteins in an aqueous medium under conditions at which flocculation is substantially avoided, dissolving the gelling agent in a substantially protein-free aqueous medium of a pH value of 1–7, combining the aqueous medium obtained and optionally adjusting the pH value to 3.0 to 6.8.

4 Claims, No Drawings

LOW FAT SPREAD

The invention relates to a process for preparing a low fat spread and to a low fat spread so obtained. The low fat spread prepared according to the invention is an emulsion of the water-in-oil type which, as compared with butter or margarine, has a considerably reduced fat content, e.g. 25–65%, preferably 30–50% by weight of the emulsion. Low fat spreads generally contain a continuous plastic fat phase and a dispersed, substantially protein-free aqueous phase, and are stabilised by emulsifiers that are usually present in margarine. Due to the high water content, the organoleptic properties of such products and/or the stability of the emulsion are however not so good as that of butter or margarine. With the object of improving the organoleptic properties of low fat spreads, many products have been developed that contain proteins in the dispersed aqueous phase. Proteins, however, introduce a number of other problems, particularly due to the lipophilic properties of proteins, as a result of which destabilisation of the emulsion may easily occur. Furthermore proteins increase the risk of microbiological contamination enormously.

The present invention provides a process for preparing a proteinaceous low fat spread stabilised by a gelling agent, by emulsifying, cooling and working a plastic fatty phase and a proteinaceous aqueous phase containing a gelling agent, to obtain a water-in-oil type emulsion, characterised in that an aqueous phase is used which contains a gelling agent of a slip melting point of 25°–35° C, and that conditions leading to the formation of undissolved protein particles of an average major dimension of more than 5 microns are substantially avoided.

The low fat spread thus obtained comprises a continuous plastic fatty phase and a dispersed proteinaceous aqueous phase, which is gelled by means of a gelling agent of a slip melting point of 25°–35° C, any undissolved protein particles having an average major dimension of no more than 5 microns. Preferably the average major dimension of any undissolved protein particles is no more than 1 micron and particularly at least 90% of the undissolved proteins have a particle size of no more than 1 micron.

The type of gelling agent to be used in the low fat spread of the present invention is extremely critical, since most gelling agents that can assist in the stabilisation of the emulsions have too high a melting point and give a gluey unpleasant impression upon chewing the emulsion prepared therewith in the mouth. A gelling agent of a melting point of 25°–35° C adequately stabilises the product at normal use temperatures, e.g. 5°–25° C and allows a fine dispersion of the proteinaceous aqueous phase in the fat phase, but it will melt in the mouth, thereby destabilising the emulsion while releasing the water-soluble flavouring ingredients which will thereby contact the papillae in the mouth.

Gelatin and Danish agar are gelling agents that are suitable for the purpose of the invention.

The content of gelling agent can vary from 0.2–6%. Danish agar is preferably used in proportions somewhat lower than gelatin and for this gelling agent the preferred proportion is e.g. 0.2–3.0%. The amount of gelling agent that is required for adequate stabilisation of the low fat spread of the invention to some extent also depends on the hardness of the fat blend of the low fat spread, particularly at refrigerator temperature. Therefore 0.5–1.0% of gelatin is preferably used in the low fat spreads containing a fat blend of a hardness of about 100–300 g/cm$^2$ at 5° C, 1.0–2.5% with a fat blend of a hardness of 300–1000 g/cm$^2$ and 2.5–6% with a fat blend of a hardness of 1000–3000 g/cm$^2$ at 5° C. The proportions of Danish agar necessary for stabilisation of such products are correspondingly lower i.e. about 0.2–0.6%, 0.6–1.2% and 1.2–3% respectively. (The hardness values mentioned in this specification were determined by the method of Haighton, as described in Journal of Am. Oil. Chem. Soc. 36 (1959) pp 345–348.) The protein content can vary from about 0.01–8%, preferably to 2–5% by weight of the low fat spread. The weight ratio between proteins on the one hand and gelling agents on the other hand in the low fat spread of the present invention is also of importance, and is preferably from (1–6):(8–1), particularly (4–8):(6–2). (In this specification all percentages are calculated on the total weight of the low fat spread unless otherwise indicated.)

Any milk or vegetable protein can be used for the purpose of the invention, however, in this specification any proteinaceous gelling agents are not regarded as being proteins.

Preferably the emulsion and particularly its fatty phase further comprises partial glycerides, preferably mono-glycerides, of saturated fatty acids with 16–18 carbon atoms, e.g. 0.05–1% by weight.

For bacteriological reasons the pH of the aqueous phase should be adjusted to values within the range of about 3.0–6.8, preferably about 4.6–5.8. Under conventional processing conditions flocculation of the proteins can easily occur, particularly at the lower range of pH values.

Therefore according to a preferred embodiment of the invention the proteinaceous low fat spread which is stabilised by a gelling agent is prepared by combining proteins with an aqueous medium under conditions at which flocculation is substantially avoided, dissolving the gelling agent of a melting point of 25°–35° C in a substantially protein-free aqueous medium of a pH value of 1–7, combining the aqueous media obtained and optionally adjusting the pH value to 3.0–6.8.

Preferably the proteins are dissolved or dispersed in an aqueous medium and particularly if the solution of the gelling agent is acidified, the proteins are dissolved in a substantially neutral aqueous medium together with a deflocculation agent. Suitable deflocculation agents are e.g. Xantan gum, locust bean gum, guar, and sodium carboxymethyl cellulose, which agents can e.g. be used in proportions of about 0.05–0.5% by weight.

Suitably the gelling agent of a melting point of 25°–35° C is dissolved in an aqueous medium at a temperature of 60°–100° C and this solution is subsequently combined with the aqueous protein solution, particularly such that at the moment of contacting these two phases a temperature of at most 40° C, preferably 30°–40° C is obtained. This temperature can either be obtained by adjusting the relative volumes and temperatures of the solutions to be combined or by intermediate cooling of the gelling agent solution.

For preparing the low fat spread of the present invention the proteinaceous aqueous phase containing the gelling agent and, if desired, further minor ingredients, e.g. salt, preservatives, partial glycerides, viscosity increasing agents (e.g. phosphates and citrates) are mixed with a suitable fatty phase, e.g. a plastic margarine fat including, if desired, partial glycerides. The temperature of the mixture of aqueous phase and fatty phase is preferably adjusted to 30°–60° C, however, no more than 50° C when the pH of the aqueous phase is no more than 5.2 and deflocculation agents are absent. This mixture is subsequently fed into one or more cooled surface-scraped heat-exchangers and resting tubes and the emulsion obtained is finally packed.

The invention will now be illustrated by the following examples in which all percentages are by weight of the low fat spreads, unless otherwise indicated.

EXAMPLE I

A low fat spread was prepared from the following ingredients:

| aqueous phase: | sodium caseinate | 2.5 | % |
| --- | --- | --- | --- |
| | gelatin (melting point 32° C) | 1.5 | % |
| | NaCl | 1.5 | % |
| | K-sorbate | 0.12 | % |
| | $Na_2HPO_4 \cdot 2H_2O$ | 0.15 | % |
| | citric acid | 0.125 | % |
| | saturated monoglycerides from lard | 0.05 | % |
| | water | 54.1 | % |
| fatty phase | (plastic margarine fat including 0.2% saturated monoglycerides from lard) | 40 | % |

The margarine fat contained 60 parts of sunflower oil, 10 parts of partially hydrogenated soyabean oil and 30 parts by weight of coconut oil; the hardness value at 5° C was 450.

The low fat spread was prepared as follows:

The minor ingredients of the aqueous phase, except the caseinate, were dissolved in half the water at 80° C (pH 3.8). The caseinate was dissolved in the other half of the water at 80° C. Both solutions were cooled to 35° C and combined and thoroughly mixed. The pH was 5.2.

The aqueous phase was then emulsified with the fat blend of 45° C and the water-in-oil type emulsion obtained was passed through a Votator A-unit, a crystallizer, another Votator A-unit, a crystallizer and then packed at 15° C.

An excellent stable proteinaceous low fat spread containing a gelled aqueous phase with good mouth-feel characteristics was obtained. The undissolved protein particles present (about 40% of the total amount of caseinate) had an average major dimension of 0.5 micron.

The product was excellently spreadable at 5° C.

EXAMPLE II

Example I was repeated except that a fat blend was used of a hardness value at 5° C of 850 and a gelatin concentration of 2.0% was used. Although the product was harder at 5° C than that of Example I, it was still spreadable and upon spreading no phase separation could be observed. All other properties were identical with the low fat spread of Example I.

EXAMPLE III

Example I was repeated except that the fatty phase further contained 0.1% of soya bean phosphatides and that instead of 2.5% sodium caseinate 20% by weight of bacteriologically acidified skim milk was combined with part of the water and the minor ingredients, except citric acid and gelatin. The gelatin was dissolved in the remaining half of the water. The pH of the product was 4.9. The acidified milk proteins were to a great extent precipitated and the average particle size was below 0.2 micron.

EXAMPLE IV

Example III was repeated except that a fat blend was used giving a hardness of 2500 g/cm² at 5° C, and that the gelatin content was 5%. No hydrophosphate was used in the aqueous phase. The remaining proportions were the same except that the water content was correspondingly adjusted. The product properties were, except for the hardness values and correspondingly reduced spreadability at lower temperatures, almost identical with those of the product of Example III. A marked difference, however, was that this product had an improved plasticity, probably due to the increased gelatin content.

EXAMPLE V

Example I was repeated except that no common salt and phosphate and instead of gelatin 0.4% of Danish agar with a melting point of 35° C were used. No differences in product characteristics were observed.

EXAMPLE VI

A low fat spread was prepared from the following ingredients:

45% of a plastic margarine fat blend giving a hardness value of 520 g/cm² at 5° C (including 0.2% of saturated monoglycerides from lard);
55% of an aqueous phase, consisting of:

30% of curd (prepared by bacteriologically souring milk and separating whey until a protein content of 12% was obtained,
0.1% of Xantan gum,
1.5% of gelatin,
23.4% of water.

The low fat spread was prepared as follows:

Gelatin and Xantan gum were dissolved in water of 80° C and mixed with the curd, which had a temperature of 20° C. The mixture was pasteurized by heating it for 10 minutes at 78° C, cooled to 40° C and mixed with the fatty phase of 45° C. Further processing took place as described in Example I. A water-in-oil type low fat spread was obtained of a pH of 4.7., which was excellently spreadable at 5° C without any noticeable water-separation.

The product had a fresh acid taste and the average particle size of the precipitated protein particles, which amounted to about 90% of the protein content, was less than 1 micron.

We claim:

1. Process for preparing a proteinaceous low fat spread of the water-in-oil type which comprises:
    (i) preparing a proteinaceous substantially neutral aqueous medium which is substantially free from undissolved protein particles of an average major dimension of more than 5 microns.
    (ii) dissolving a gelling agent of a melting point of 25°–35° C in a substantially protein-free aqueous medium of a temperature of 60°–100° C and a pH value of 1–7.
    (iii) combining the aqueous media obtained to obtain an aqueous phase having a weight ratio of proteins: gelling agent of (1–6):(8–1), and optionally adjusting the pH value to 3.0–6.8.

(iv) dispersing the aqueous phase of a temperature of no more than 40° C in a fatty phase of a hardness value at 5° C of 100–3000 g/cm².

(v) passing the mixture through one or more cooled surface scraped heat-exchangers and resting tubes.

2. Process according to claim 1, in which gelatin is used as gelling agent.

3. Process according to claim 1, in which Danish agar is used as gelling agent.

4. Process according to claim 1, in which the proteins are dissolved in a substantially neutral aqueous medium together with a deflocculation agent selected from the group consisting of xantan gum, locust bean gum, guar and sodium carboxy methyl cellulose.

* * * * *